Dec. 4, 1928.
H. H. KNOTT
1,693,904
CHUCK POSITIONING DEVICE AND DRILL GUIDE FOR DRILLING MACHINES
Filed Jan. 6, 1927
2 Sheets-Sheet 1
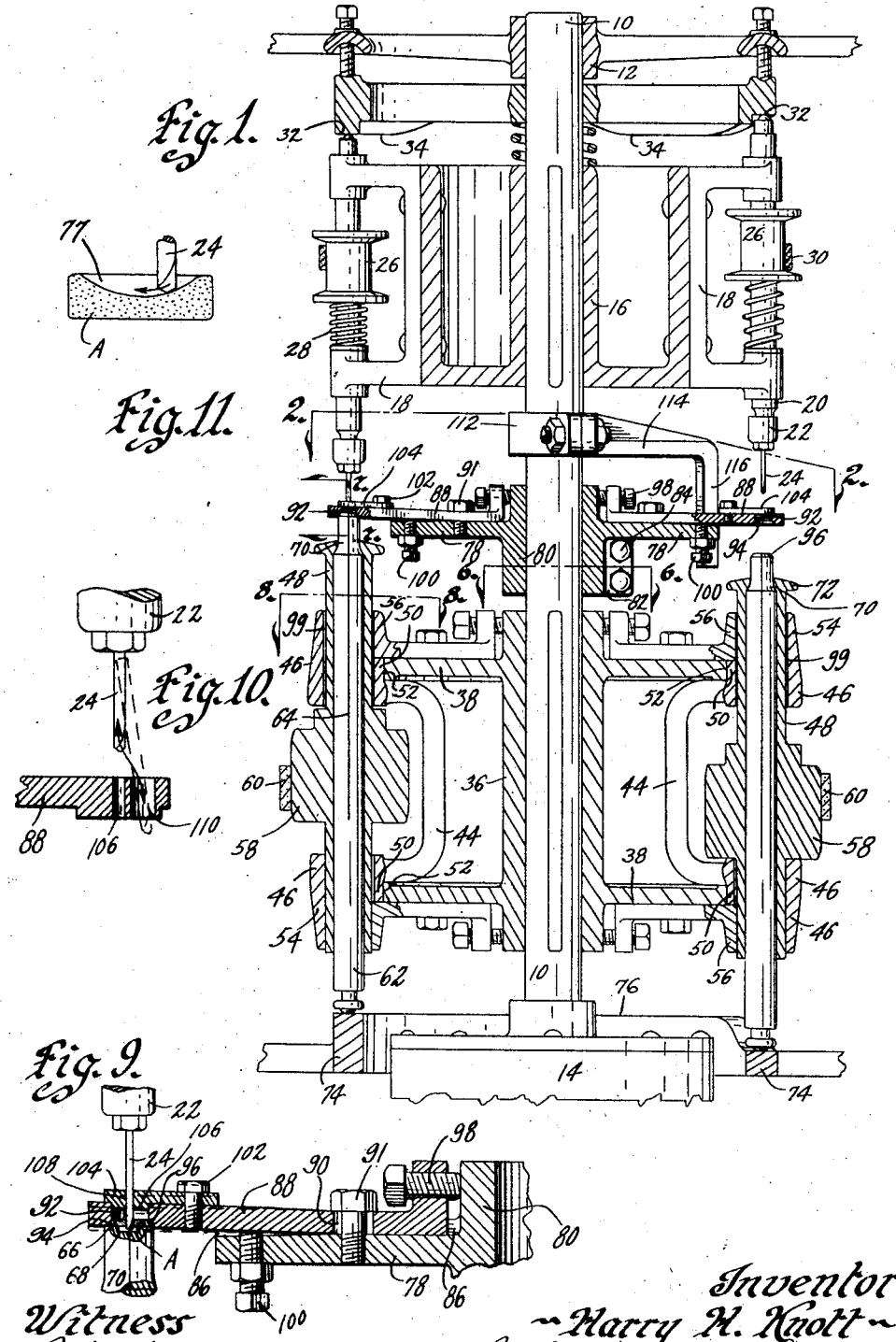
Inventor
Harry H. Knott
by Bair & Freeman Attorneys
Witness

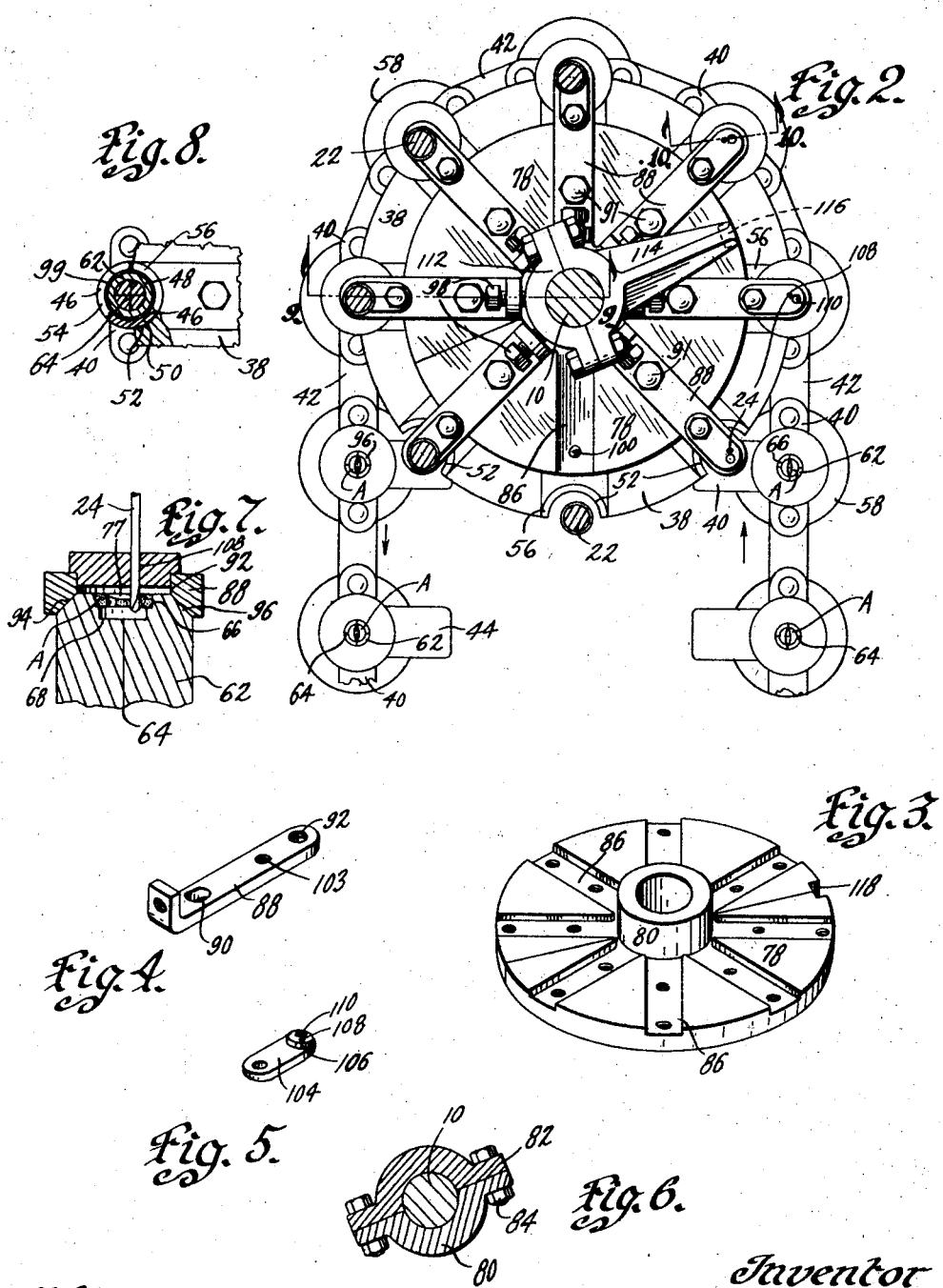

Patented Dec. 4, 1928.

UNITED STATES PATENT OFFICE.

1,693,904

HARRY H. KNOTT, OF WASHINGTON, IOWA.

CHUCK-POSITIONING DEVICE AND DRILL GUIDE FOR DRILLING MACHINES.

Application filed January 6, 1927. Serial No. 159,380.

The object of my invention is to provide means for positioning a work holding chuck and for guiding a drill when drilling the work in the chuck and it is my purpose to provide such means of simple, durable and comparatively inexpensive construction.

More particularly it is my object to provide such positioning and guiding means for use on an automatic button drilling machine.

A further object is to provide a supporting disk having the chuck positioning devices and drill guides mounted thereon.

Still a further object is to so mount the chuck positioning devices that when the chucks engage them, the positioning devices will be moved slightly for exerting a spring tension against the chucks for securely holding them in position for the drill to operate on the work held in the chucks.

Still a further object is to provide drill guiding means detachably mounted on the positioning means whereby drill guides for different sized drills may be secured to the positioning devices.

Still a further object is to provide the positioning devices of resilient material and secure them to the disk at their inner ends whereby their outer ends are free to be engaged by the chucks and moved by them.

A further object is to provide grooves in the disk in which the positioning devices are seated to prevent their being moved out of line with the chucks.

Still a further object is to provide for adjustment of the disk toward or away from the chucks whereby chucks of various lengths may be provided for.

Still a further object is to provide an aligning device for the supporting disk for preventing the disk from rotating but allowing its longitudinal movement.

With these and other objects in view, my invention consists in the construction, arrangement and combination of the various parts of my chuck positioning device and drill guide for drilling machines, whereby the objects contemplated are attained, as hereinafter more fully set forth, pointed out in my claims, and illustrated in the accompanying drawings, in which:

Figure 1 is a vertical sectional view through the drill head and chuck supporting shaft of a button drilling machine and illustrates one embodiment of my invention for positioning the upper ends of the work holding chucks and for guiding the drills.

Figure 2 is a sectional view on the line 2—2 of Figure 1 and illustrates a plan view of my invention as applied to the button drilling machine with one of the positioning bars removed.

Figure 3 is a perspective view of the supporting disk for supporting the positioning devices and drill guides of my invention.

Figure 4 is a perspective view of a positioning bar.

Figure 5 is an inverted perspective view of a drill guide.

Figure 6 is a sectional view on the line 6—6 of Figure 1.

Figure 7 is a sectional view on the line 7—7 of Figure 1.

Figure 8 is a sectional view on the line 8—8 of Figure 1.

Figure 9 is an enlarged sectional view on the line 9—9 of Figure 2.

Figure 10 is an enlarged detail sectional view on the line 10—10 of Figure 2 illustrating the manner of replacing a drill in the drill chuck of the button drilling machine; and Figure 11 is an enlarged cross sectional view through a button showing a drill in position to start drilling a hole in the button.

On the accompanying drawings I have used the reference numeral 10 to indicate a vertical shaft which is rotatably mounted at one end of a button drilling machine and is driven by suitable mechanism. The shaft 10 is rotatably mounted at its upper end in a bearing 12 and at its lower end in the driving gear casing 14.

Secured to the shaft 10 is a drill head supporting member 16 having a plurality of drill heads 18 secured thereto. Each drill head 18 comprises a shaft 20, drill chuck 22, drill 24 and pulley 26. A spring 28 is interposed between the pulley 26 and the lower bearing of the drill head 18. The pulley 26 is secured to the shaft 20 and all the pulleys 26 are driven by a belt 30. The spring 28 normally holds the drill 24 in raised position and a track 32 against which the upper end of the shaft 20 contacts has lowered portions 34 for moving the drill 24 downwardly.

A sleeve 36 is secured to the shaft 10 and has a pair of sprockets 38 for coacting with a pair of chains of peculiar construction.

The chains referred to consist of links 40 and 42. There are two sets of these chains, one above the other, and the upper and lower links 40 of the chains are connected by portions 44.

Both the upper and lower links 40 have bearings 46 encircling and thereby rotatably supporting tubular shafts 48. The portions 50 of the bearings 46 engage in depressions 52 in the sprockets 38 similar to the rollers of standard roller chains. Half bearing portions 54 of the bearings 46 extend only half way around the tubular shafts 48. Half bearings 56 are secured to the sprockets 38 and these half bearings meet the half bearing portions 54 of the bearings 46 when the portions 50 engage in the depressions 52. The half bearings 54 and 56 then comprise complete bearings for supporting and positioning the ends of the tubular shafts 48. It may here be mentioned that there are two sets of sprocket wheels 38 on a button drilling machine and the portions 44 of the links 40 merely act as carriers for maintaining the bearings 46 in proper relation to each other for carrying the tubular shafts 48 as they are transported from one set of the sprocket wheels to the other set.

The tubular shafts 48 are provided with pulley portions 58 and are rotated at proper times by a belt 60. The belt 60 or a spring (not shown) is used to hold the tubular shafts 48 in the half bearings 56 for properly aligning the buttons for drilling.

Slidably mounted within the tubular shafts 48 are button holding chucks comprising shafts 62 split as at 64. The upper ends of the shafts 62 are recessed at 66 to receive a button blank A. A smaller recess 68 is formed in the upper end of each shaft 62. The upper end of the shaft 62 is tapered as indicated at 70 and is received in a closing flange 72 of the tubular shaft 48 so that the four quarters of the shaft 62 may be spread when the shaft 62 is moved downwardly relative to the sleeve 48 or may be brought together when the shaft 62 is moved upwardly relative to the tubular shaft 48. The purpose of this is for allowing the insertion of a button blank and for gripping the button blank. The mechanism for doing this is not illustrated as it is but part of an ordinary automatic button drilling machine and forms no part of my present invention.

The lower end of each shaft 62 is in contact with a cam track 74 having raised portions 76 for moving the button chuck and tubular shaft 48 upwardly.

In the operation of this machine the tubular shafts 48 are loosely and rotatably mounted in the bearings 46. When the tubular shafts 48 engage in the half bearings 56, a comparatively tight bearing, that is, one without play is provided for preventing any variation in the movement of the upper end of the shaft 62 in which the button blank is held for drilling purposes. The drill 24 is then moved toward the shaft 52 for drilling a hole in the button blank. Any slight play which develops in the bearings 46 and 56 will allow the upper end of the shaft 62 to be thrown out of line thereby drilling the hole through the button blank to one side of the position it should assume. Furthermore the button blank A is usually provided with a "fish eye" 77 which has a sloping bottom. The drill 24 is caused to drill a hole through the button blank A at one side of the center thereof and therefore on the slanting portion of the bottom of the fish eye 77. The drill therefore has a tendency to drift toward the center as it is comparatively small and there is considerable distance between the drilling end of the drill and the drill chuck 22. This drifting also has a tendency to bend and eventually break the drill 24 and any slight wear in the drill head or button chuck mechanism will cause the machine to drill the button holes so far from their true position that they are unusable.

It may here be mentioned that a hole is drilled at one side of the center of the button blank A. The button chuck is then turned a half turn for two hole buttons and another hole drilled off center for making two holes in the button spaced on either side of the center. For four hole buttons, the chuck is turned a fourth turn between drilling operations and four holes drilled off center.

The foregoing description relates to a standard automatic button drilling and facing machine and forms no part of my invention.

My present invention consists of a supporting disk 78 having a hub 80. The hub 80 fits over the supporting shaft 10. The disk and hub are split longitudinally and the hub 80 is formed with ears 82 whereby the halves of the disk may be positioned on opposite sides of the shaft 10 and securely clamped thereto by means of bolts 84. In this manner it is not necessary to disassemble any part of the button drilling machine for applying my attachment thereto.

The disk 78 is formed with a plurality of circumferentially spaced grooves 86 extending radially from the hub 80. Chuck positioning bars 88 are seated in the grooves 86 and are secured to the disk adjacent their inner ends. Cap screws 91, threaded into the disk, extend through slotted openings 90 in the chuck positioning bars.

The outer ends of the chuck positioning bars are provided with openings 92 having tapered portions 94. The chuck shafts 62 are beveled as at 96 for coacting with the tapered portions 94 of the openings 92. The positioning bars 88 may be adjusted in the grooves 86 by manipulating the set screws 98 which bear against the hub 80. Thereafter the cap screws 91 may be tightened to maintain the adjustment of the positioning bars.

The positioning bars 88 are formed of slightly resilient material and normally rest on the bottoms of the grooves 86 unless otherwise adjusted by means of the adjustable stop or set screw 100. In operation the disk 78 is positioned on the shaft 10 so that the chuck shafts 62 when moved to their upper limit of movement will slightly raise the outer ends of the positioning bars 88 thereby securely positioning the upper ends of the button blank holding chucks.

Secured to the positioning bars 88 by cap screws 102 are drill guides 104. The cap screws 102 are screwed into threaded openings 103 in the bars 88. The drill guides 104 each comprise a plate having a boss 106 thereon substantially the same diameter as the opening 92 and designed to be received therein. In this manner the drill guides are removable and can be replaced by other drill guides.

Each drill guide 104 is provided with a drill guide opening 108 substantially the same diameter as the drill 24. When different drills 24 are used different drill guides 104 are secured to the positioning bars 88 and have drill guide openings corresponding to the drills used.

Adjacent the drill guide opening 108 is a larger opening 110 for inserting or removing the drill from the drill chuck 22. This is illustrated in Figure 10 and is desirable so that the drill 24 will not have to be inserted or removed through the small opening 106 and thereby facilitates replacement of the drill 24.

In the use of button drilling and facing machines the upper ends of the shafts 62 become worn with use. To accommodate for this variation the disk 78 is movable longitudinally relative to the shaft 10. However, it is desirable that the positioning bars 88 should not be moved out of alignment with the chucks 62 and to therefore prevent rotation of the disks 78 I have provided an aligning device comprising a collar 112 secured to the shaft 10. An arm 114 extends from the collar 112 and has a depending key 116. A notch 118 is provided in the disk 78 for receiving the key 116. By this arrangement rotation of the disk 78 is prevented.

I have used my positioning device and drill guide quite extensively on a button drilling machine and find it very satisfactory. The holes in the button blanks A are all drilled uniformly and at their proper positions. No drifting of the drill is encountered inasmuch as the drill guide is positioned very close to the button blank. Variations in the position of the chucks due to wear in the bearings 46 and 56 do not change the position of the work holding end of the button chucks as they are resiliently held in position due to their beveled ends engaging the tapered portions of the openings in the positioning bars. Drills are not broken due to drifting and to wobbling of the button chuck. The drills furthermore can be used much longer without resharpening. In applying my attachment to a button drilling and facing machine, I adjust the upper half bearing 56 inwardly about one sixteenth of an inch and therefore leave the tubular shaft 48 very loose in its upper bearing as indicated at 99 on the drawings. This leaves the shaft 62 free so that when moved upwardly by the cam surface 76 the beveled end readily finds its seat in the tapered portion 94 of the opening 92 in the positioning bar 88. The upper half bearings therefore are not in use while drilling the button and consequently do not need replacing as when my attachment is not used. The tubular shafts 48 also do not need replacing as any wear of them in their bearings does not render them inaccurate because their upper ends are positioned by the positioning bars 88. This is a considerable saving in the operation of a machine as replacing all half bearings and tubular shaft is considerably expensive. Mechanics for keeping the shafts 62 properly aligned by adjusting the bearings 56 are also dispensed with. The use of my attachment insures an accuracy in drilling buttons which is especially appreciated by manufacturers who have machines for sewing buttons on garments. Button holes out of line cause breakage of needles in such machines.

Although I have illustrated my invention in connection with a button drilling machine it is obvious that it may be adapted to drilling machines of any character wherein the chuck may be positioned in a similar manner and a guide on the positioning means may be provided for the drill.

I also do not wish to limit myself to a drilling machine as my device could be used with a guide designed to fit any other type of cutter.

Some changes may be made in the construction and arrangement of the various parts of my chuck positioning device and drill guide for drilling machines without departing from the real spirit and purpose of my invention, and it is my intention to cover by my claims any modified forms of structure or use of mechanical equivalents which may be reasonably included within their scope.

I claim as my invention:

1. In combination with a drilling machine having a reciprocably mounted chuck and a reciprocably mounted drill, a positioning and guide device therefor comprising a resilient positioning bar rigidly secured at one end and having an opening in the other end thereof, one end of said chuck being adapted to engage in said opening and move the free end of said positioning bar along substantially the axis line of the chuck when it is moved to one of its positions whereby the chuck is securely held in drilling position by said positioning bar and due to the resiliency thereof, a guide plate adjacent said opening and an opening in said plate adapted to guide said drill when it is moved to one of its positions for drilling work held in the chuck.

2. In combination with a drilling machine having a reciprocably mounted chuck, the work holding end of which is loosely journaled, a positioning device therefor comprising a resilient positioning bar rigidly secured at one end and having an opening in the other end thereof, the end of said chuck being adapted to engage in said opening and slightly move the free end of said positioning bar in substantial alignment with the axis of the chuck, when the chuck is moved to one of its positions whereby the chuck is securely held in drilling position due to the resiliency of said positioning bar.

3. In combination with a drilling machine having a reciprocably mounted chuck, and a reciprocably mounted drill, a positioning and guide device therefor comprising a resilient positioning bar, a tapered opening therein, the holding end of said chuck being loosely journaled and beveled for engagement in said opening when the chuck is moved to one of its positions whereby the chuck is securely held in drilling position due to the resiliency of said positioning bar, a guide plate adjacent said opening and an opening in said plate adapted to guide said drill when it is moved to one of its positions for drilling work held in the chuck.

4. A chuck positioning device and drill guide for drilling machines comprising a chuck positioning bar for engaging the chuck of the machine, said bar having a tapered opening, the work holding end of said chuck being tapered to engage in said opening when the chuck is moved to drilling position, a guide plate having a portion extending into said opening, said guide plate having an opening adapted to guide the drill of the drilling machine when said drill is moved to drilling position.

5. The combination with a drilling machine having a shaft for supporting circumferentially arranged and radially spaced drill heads and chucks, said drill heads and chucks being mounted for slidable movement toward each other, of a positioning device for said chucks comprising a supporting disk secured to said shaft, positioning bars secured to said plate and having openings in their outer ends for engaging said chucks when they are moved to drilling position whereby the chucks are positioned and means for guiding said drills comprising guide plates removably secured to said positioning bars and having openings therein for guiding the drills when they are moved to drilling position.

6. The combination with a drilling machine having a shaft for supporting circumferentially arranged and radially spaced drill heads and chucks, said drill heads and chucks being mounted for slidable movement toward each other, a positioning device for said chucks comprising a supporting disk secured to but capable of being loosened and slid longitudinally on said shaft, an aligning means for said supporting disk comprising an arm secured to said shaft, a key extending from said arm and parallel to said shaft, a notch in said supporting disk for receiving said key whereby the disk may be slid longitudinally relative to said shaft but will not rotate thereon, positioning bars secured to said plate and having openings in their outer ends for engaging said chucks when they are moved to drilling position whereby the chucks are positioned.

7. The combination with a drilling machine having a shaft for supporting circumferentially arranged and radially spaced drill heads and chucks, said drill heads and chucks being mounted for slidable movement toward each other, a positioning device for said chucks comprising a supporting disk secured to said shaft, resilient positioning bars having their inner ends secured to said plate and having openings in their outer ends for engaging said chucks when they are moved to drilling position whereby the chucks are positioned, said disk being positioned relative to the chucks whereby said chucks, in drilling position, move the outer ends of the positioning bars to thereby impose a spring tension for maintaining engagement between the positioning bars and the chucks.

8. The combination with a drilling machine having a shaft for supporting circumferentially arranged and radially spaced drill heads and chucks, said drill heads and chucks being mounted for slidable movement toward each other, a positioning device for said chucks comprising a supporting disk secured to said shaft, resilient positioning bars having their inner ends secured to said plate and having openings in their outer ends for engaging said chucks when they are moved to drilling position whereby the chucks are positioned, said disk being positioned relative to the chucks whereby said chucks, in drilling position, move the outer ends of the positioning bars to thereby impose a spring tension for maintaining engagement between the positioning bars and the chucks, and means for guiding said drills comprising guide plates removably secured to said positioning bars and having openings therein for guiding the drills when they are moved to drilling position.

Des Moines, Iowa, Dec. 21, 1926.

HARRY H. KNOTT.